United States Patent
Li et al.

(10) Patent No.: US 9,825,675 B2
(45) Date of Patent: Nov. 21, 2017

(54) METHOD AND APPARATUS FOR MANAGING COORDINATED MULTI-POINT SET

(71) Applicant: Nokia Technologies Oy, Espoo (FI)

(72) Inventors: Haitao Li, Beijing (CN); Kodo Shu, Shanghai (CN); Huawen Bu, Shanghai (CN); Zhi Yuan, Shanghai (CN); Honglin Hu, Shanghai (CN); Huiyue Yi, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/902,229

(22) PCT Filed: Jul. 4, 2013

(86) PCT No.: PCT/CN2013/078789
§ 371 (c)(1),
(2) Date: Dec. 30, 2015

(87) PCT Pub. No.: WO2015/000155
PCT Pub. Date: Jan. 8, 2015

(65) Prior Publication Data
US 2016/0226562 A1    Aug. 4, 2016

(51) Int. Cl.
*H04B 7/02* (2006.01)
*H04B 7/024* (2017.01)
(Continued)

(52) U.S. Cl.
CPC ............ *H04B 7/024* (2013.01); *H04W 16/14* (2013.01); *H04W 16/32* (2013.01); *H04W 48/02* (2013.01)

(58) Field of Classification Search
CPC ..... H04W 48/02; H04W 16/32; H04W 16/14; H04B 7/024
See application file for complete search history.

(56) References Cited

U.S. PATENT DOCUMENTS

| 2012/0063383 A1* | 3/2012 | Barbieri ............ H04W 72/082 370/315 |
| 2012/0135771 A1* | 5/2012 | Futaki .................. H04B 7/024 455/509 |

(Continued)

FOREIGN PATENT DOCUMENTS

| CN | 102387556 A | 3/2012 |
| CN | 102932938 A | 2/2013 |
| WO | 2011116240 | 9/2011 |

OTHER PUBLICATIONS

International Search Report and Written Opinion received for corresponding Patent Cooperation Treaty Application No. PCT/CN2013/078789, dated Jul. 4, 2013, 10 pages.

(Continued)

*Primary Examiner* — Marcos Torres
(74) *Attorney, Agent, or Firm* — Harrington & Smith (57) ABSTRACT

Embodiments of the disclosure provide methods and apparatuses for managing a COMP set in a communication system employing an ASA scheme. According to the method, change information about an affected cell is received, wherein the change information uses an ASA frequency band and overlaps with a protected area of a primary system authorized with the ASA frequency band. The change information is then sent to a serving node coordinating transmission within constituent cells of a CoMP set, to indicate a change of the CoMP set, wherein the affected cell is one of the constituent cells of the CoMP set.

20 Claims, 5 Drawing Sheets

(51) Int. Cl.
  *H04W 16/14* (2009.01)
  *H04W 16/32* (2009.01)
  *H04W 48/02* (2009.01)

(56) References Cited

U.S. PATENT DOCUMENTS

| | | | |
|---|---|---|---|
| 2013/0070626 A1 | 3/2013 | Gaal et al. | |
| 2013/0078924 A1 | 3/2013 | Choudhury et al. | |
| 2013/0121272 A1* | 5/2013 | Barbieri | H04W 72/08 370/329 |
| 2013/0165122 A1* | 6/2013 | Tanaka | H04B 7/024 455/436 |
| 2015/0289141 A1* | 10/2015 | Ghasemzadeh | H04W 16/14 370/330 |
| 2016/0330641 A1* | 11/2016 | Zhang | H04W 24/08 |

OTHER PUBLICATIONS

Extended European Search Report received for corresponding EP Application No. 13888898.7 dated Jan. 26, 2017, 7 pages.

* cited by examiner

METHOD AND APPARATUS FOR MANAGING COORDINATED MULTI-POINT SET

RELATED APPLICATION

This application was originally filed as Patent Cooperation Treaty Application No. PCT/CN2013/078789 filed Jul. 4, 2013.

FIELD OF THE INVENTION

Embodiments of the present invention generally relate to communication techniques. More particularly, embodiments of the present invention relate to a method and apparatus for managing a Coordinated Multi-Point (CoMP) set in a communication system employing an Authorized Shared Access (ASA) scheme.

BACKGROUND OF THE INVENTION

For a wireless communication system, one of most significant issues is spectrum scarcity because of limited radio frequency spectrum. With the evolution of LTE, the required bandwidth increases. To solve spectrum scarcity on LTE band and spectrum under-utilization on some other licensed band, it needs to deploy a cognitive LTE Network to opportunistically use spectrum holes, optimize the LTE system, and to enable it with CR technology.

In order to increase sensing-based incumbent detection reliability, new techniques to address the sensing coordination in heterogeneous scenarios are needed. Some problems when detecting heterogeneous primary system or secondary networks include: different channel bandwidth definitions by each of the coexisting networks, transmission signal power variations among operating standards, and signal characteristics among heterogeneous PHY modes.

For cognitive radio systems, a spectrum authorization scheme named "Authorized Shared Access (ASA)" is proposed. ASA is an evolutionary spectrum authorization scheme for sustainable economic growth and consumer benefit. ASA is a new spectrum management tool, using cognitive radio technologies, which permits controlled sharing of under-used spectrum. ASA enables timely availability and licensed use of harmonized spectrum for mobile with predictable quality of service. Alongside the use by the incumbent, a secondary user, the ASA user, can be granted an ASA right to utilize the under-used spectrum without interfering with the incumbent user. There may be one or several ASA users per frequency band as there may be one or several incumbent users. As a result, the ASA is an important contributor to solving the spectrum shortage.

Coordinated multipoint (CoMP) is a technology to minimize inter-cell interference. A plurality of geographically contiguous cells—referred to as constitute cells—are grouped together to form a CoMP cooperating set or a CoMP set. Each CoMP set has a serving node that coordinates transmission within its constituent sub-cells so as to minimize inter-cell interference within the CoMP cell (referred to herein as inter-sub-cell interference). The serving node minimizes inter-sub-cell interference by coordinating scheduling of transmissions to and from user equipment (UE) within the cells, and/or actively suppressing interference using signal processing techniques.

In a communication system employing both the ASA scheme and the CoMP scheme, when a primary system requests for the ASA frequency band (e.g., f1) in a specific area (protected area), an ASA controller sends a message including, for example, primary system's interference boundary, usage of spectrum and tolerable interference threshold to an operator OAM. The operator OAM forwards the message to a MME and requests the MME to evacuate the ASA spectrum f1 in areas that cause interference to the primary system. Upon receiving the message, the MME finds that a cell in the CoMP set will be affected. Then the MME requests a BS managing the cell (called as "affected BS") to evacuate ASA spectrum f1. Therefore, the CoMP set will be changed due to ASA spectrum availability.

According to the conventional CoMP scheme, when the affected BS evacuates the ASA spectrum f1, the serving node does not immediately know CoMP set change, e.g., before the UE reports the loss of this specific cooperating cell. As such, the serving node can not determine whether the CoMP reception will be continued as expected in advance. As a result, the UE's QoS can not be ensured. Moreover, the serving node may still configure the UE to perform CoMP-related measurement even though the affected BS has evacuated the ASA spectrum f1.

As such, in the case that the CoMP set is changed due to the ASA spectrum change, the conventional scheme will introduce unnecessary signaling overhead and UE's measurement.

In view of the foregoing problem, there is a need to design a solution for managing a CoMP set in a communication system employing the ASA scheme, so as to reduce signaling reporting overhead, reduce UE's measurement and ensure continued execution of CoMP when the ASA spectrum utilization changes.

SUMMARY OF THE INVENTION

The present invention proposes a solution to manage a CoMP set in a communication system employing the ASA scheme, so as to reduce signaling reporting overhead, reduce UE's measurement and ensure continued execution of CoMP when ASA spectrum utilization changes.

According to a first aspect of embodiments of the present invention, embodiments of the invention provide a method for managing a CoMP set in a communication system employing an ASA scheme. The method may comprise: receiving change information about an affected cell which uses an ASA frequency band and overlaps with a protected area of a primary system authorized with the ASA frequency band; and sending the change information to a serving node coordinating transmission within constituent cells of a CoMP set, to indicate a change of the CoMP set, wherein the affected cell is one of the constituent cells of the CoMP set.

According to a second aspect of embodiments of the present invention, embodiments of the invention provide a method for managing a CoMP set in a communication system employing an ASA scheme. The method may comprise: receiving, from a CoMP central controller, change information about an affected cell which uses an ASA frequency band and overlaps with a protected area of a primary system authorized with the ASA frequency band; and sending an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

According to a third aspect of embodiments of the present invention, embodiments of the invention provide a method for managing a CoMP set in a communication system employing an ASA scheme. The apparatus may comprise: a first receiver, configured to receive change information about an affected cell which uses an ASA frequency band and overlaps with a protected area of a primary system authorized with the ASA frequency Band; and a first sender, configured to send the change information to a serving node coordinating transmission within constituent cells of a CoMP set, to indicate a change of the CoMP set, wherein the affected cell is one of the constituent cells of the CoMP set.

According to a fourth aspect of embodiments of the present invention, embodiments of the invention provide a method for managing a CoMP set in a communication system employing an ASA scheme. The apparatus may comprise: a second receiver configured to receive, from a CoMP central controller, change information about an affected cell which uses an ASA frequency band and overlaps with a protected area of a primary system authorized with the ASA frequency Band; and a second sender configure to send an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

According to a fifth aspect of embodiments of the present invention, embodiments of the invention provide a method for managing a CoMP set in a communication system employing an ASA scheme. The apparatus may comprise: at least one processor; and at least one memory including compute program instructions, wherein the at least one memory and computer program instructions are configured to, with the at least one processor, cause the apparatus at least to: receive change information about an affected cell which uses an ASA frequency band and overlaps with a protected area of a primary system authorized with the ASA frequency band; and send the change information to a serving node coordinating transmission within constituent cells of a CoMP set, to indicate a change of the CoMP set, wherein the affected cell is one of the constituent cells of the CoMP set.

According to a sixth aspect of embodiments of the present invention, embodiments of the invention provide a method for managing a CoMP set in a communication system employing an ASA scheme. The apparatus may comprise: at least one processor; and at least one memory including compute program instructions, wherein the at least one memory and computer program instructions are configured to, with the at least one processor, cause the apparatus at least to: receive, from a CoMP central controller, change information about an affected cell which uses an ASA frequency band and overlaps with a protected area of a primary system authorized with the ASA frequency band; and send an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

According to a seventh aspect of embodiments of the present invention, a computer program product comprising at least one computer readable storage medium having a computer readable program code portion stored thereon is provided. The computer readable program code portion may comprise: program code instructions for receiving change information about an affected cell which uses an ASA frequency band and overlaps with a protected area of a primary system authorized with the ASA frequency band; and program code instructions for sending the change information to a serving node coordinating transmission within constituent cells of a CoMP set, to indicate a change of the CoMP set, wherein the affected cell is one of the constituent cells of the CoMP set.

According to a eighth aspect of embodiments of the present invention, a computer program product comprising at least one computer readable storage medium having a computer readable program code portion stored thereon is provided. The computer readable program code portion may comprise: program code instructions for receiving, from a CoMP central controller, change information about an affected cell which uses an ASA frequency band and overlaps with a protected area of a primary system authorized with the ASA frequency band; and program code instructions for sending an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Embodiments of the invention will be described thoroughly hereinafter with reference to the accompanying drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

A base station (BS) may refer to a node B (NodeB), an evolved NodeB (eNodeB), a Base Transceiver Station (BTS), an Access Point (AP), a Radio Access Station (RAS), or a Mobile Multihop Relay (MMR)-BS, and some or all of the functions of the BS, the NodeB, the eNodeB, the BTS, the AP, the RAS, or the MMR-BS may be included.

With respect to a communication system employing both the ASA scheme and a CoMP scheme, the serving node may be a BS or any other suitable node coordinating transmission within constituent cells of the CoMP set. If a cell in the CoMP set uses the ASA frequency band and overlaps with a protected area of a primary system authorized with the ASA frequency band, it may be called as an affected cell.

The communication system according to embodiments of the present invention may be a frequency-shared system which is licensed to utilize an ASA frequency band. The ASA scheme is a novel spectrum policy, which aims to enable timely availability and licensed use of harmonized spectrum for mobile with predictable quality of service (QoS), and to dynamic use spectrum by ASA licensees whenever and wherever unused by incumbent users using cognitive radios. According to embodiments of the present invention, the communication system may be a WiMAX (Worldwide Interoperability for Microwave Access) system, a WiFi (Wireless Fidelity) system, a Bluetooth system or any other suitable system licensed to utilize the ASA frequency band.

Now some exemplary embodiments of the present invention will be described below with reference to the figures.

Figure 1:
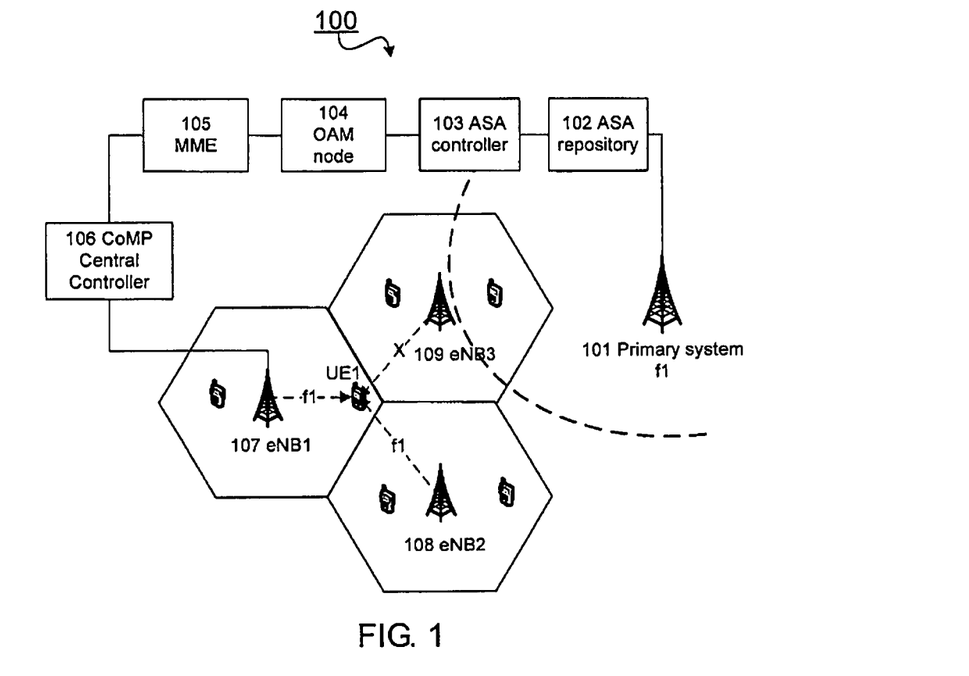
FIG. 1 illustrates a schematic diagram of a communication system 100 according to embodiments of the invention.

Reference is first made to FIG. 1, which illustrates a schematic diagram of a communication system 100 according to embodiments of the invention.

The communication system 100 may be implemented with a LTE system, a GSM system, a CDMA system, a UMTS system, etc. The system is shown as a LTE system and illustratively comprises a primary system 101 using a frequency band f1; an ASA repository 102 which may provide information on the available ASA spectrum; an ASA controller 103 for controlling utilization of the ASA frequency band f1; an Operation Administration Maintenance (OAM) node 104 comprising processes, activities, tools, standards, etc. involved with operating, administering, managing and maintaining the system; a Mobility Management Entity (MME) 105; a CoMP central controller 106 for managing the CoMP set; and three BSs (eNB1, eNB2, eNB3) 107-109 providing constitute cells of the CoMP set.

The ASA controller 103 may offer spectrum information including ASA frequency band, primary system's protection range, tolerable interference threshold of the primary system and available time for secondary system to access, and so forth. As shown in FIG. 1, the primary system 101 is connected with the ASA repository 102. The ASA Controller 103 is connected to both the ASA repository 102 and the operator OAM node 104, and the operator OAM node 104 is connected to the MME 105. The eNB1 107, eNB2 108 and eNB3 109 serve a user equipment UE1 coordinately in spectrum comprising frequency band f1 or overlap with f1. The primary system 101 is authorized with the ASA frequency band, and its protection range is shown in dashed line. According to embodiments of the present invention, the term "primary system" may refer to a system having higher priority for using the ASA frequency band than the secondary system. With respect to the communication system 100, the primary system has a protection area inside the dash line, and the secondary system can only be operated in the area outside the dash line in order not to cause interference to the primary system.

When the primary system requests ASA frequency band f1, eNB3 109 is thus requested not to use f1 any longer. As such, the cell managed by eNB3 109 is an "affected cell". In this scenario, due to the ASA spectrum availability, the communication system 100 needs to be better to maintain and enhance existing networks, for this reason, QoS, load balance and handover processing should be further considered.

Embodiments of the present invention provide a method and apparatus for managing a CoMP set in a communication system employing an ASA scheme. As further discussed below, in some embodiments, a CoMP set may comprise multiple constituent cells, for example, macro cells or small cells (like pico cells, Femto cells, etc.). A cell of the CoMP set is an affected cell, which uses an ASA frequency band and overlaps with a protected area of a primary system authorized with the ASA frequency band. A CoMP central controller may receive change information about the affected cell and send the change information to a serving node coordinating transmission within constituent cells of a CoMP set, to indicate a change of the CoMP set. As such, the serving node will know the change of the CoMP set timely, thus unnecessary signaling overhead and UE's measurement can be reduced.

For better understanding, the following embodiments of the present disclosure are described based on the mobile network shown in FIG. 1. As can be appreciated by those skilled in the art, the present disclosure can be applicable to any other suitable mobile network, but not limited to the specific arrangement shown in FIG. 1.

Figure 2:
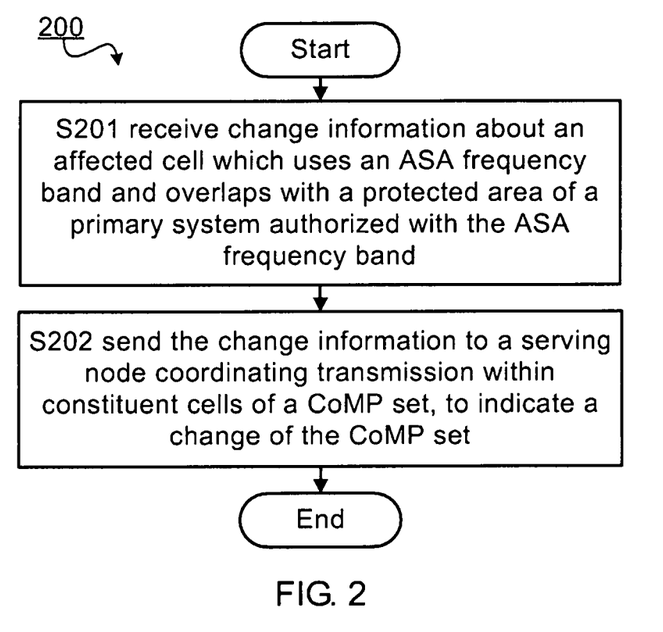
FIG. 2 illustrates a flow chart of a method 200 for managing a CoMP set in a communication system according to embodiments of the invention.

Details for solutions proposed by the present invention will be described in connection with methods illustrated in FIGS. 2-7. Reference is now made to FIG. 2, which illustrates a flow chart of a method 200 for managing a CoMP set in a communication system according to embodiments of the invention. In accordance with embodiments of the present invention, the method 200 may be carried out by a CoMP central controller. The CoMP central controller may be implemented as a separated node in the communication system (e.g., communication system 100), or may be integrated with a node, such as the MME (e.g., MME 105 as shown in FIG. 1), the serving node (e.g., eNB1 107 as shown in FIG. 1), or any other suitable node. It is noted that this is only for the purpose of illustrating the principles of the present invention, rather than limiting the scope thereof.

At step S201, change information about an affected cell is received, wherein the affected cell uses an ASA frequency band and overlaps with a protected area of a primary system authorized with the ASA frequency band.

In accordance with embodiments of the present invention, there may be multiple cells constituting the CoMP set. The affected cell is one of the constituent cells of the CoMP set. The serving node may be a serving BS which manages another one of the constituent cells.

According to some embodiments of the present invention, the change information may be received from the MME. Specifically, a primary system may request for reusing an ASA frequency band or releasing an ASA frequency band, e.g., by sending a request to an ASA repository. The ASA repository may signal the ASA controller information about the available ASA spectrum. Then the ASA controller may send to the OAM node spectrum information about the available ASA spectrum, which may include the requested or released ASA frequency band, primary system's protection range, tolerable interference threshold of the primary system and available time for secondary system to access, and so forth. The OAM node may forward the information about the available ASA spectrum to a MME. The MME may find out an affected BS based on the spectrum information and BS location information. Accordingly, change information about the affected BS may be generated. Then, the MME may send the change information to the CoMP central controller. As such, the CoMP central controller may receive the change information from the MME. Related details will be found in embodiments in connection with FIG. 6. According to some embodiments of the present invention, the MME may notify the affected BS to evacuate the ASA frequency band.

According to further embodiments of the present invention, the change information may be received from the affected cell. Specifically, a primary system may request for an ASA frequency band, e.g., by sending a request to an ASA repository. The ASA repository may signal information about available ASA frequency band to an ASA controller. Then the ASA controller may send, to the OAM node, the information about available ASA frequency band, which may include the requested or released ASA frequency band, primary system's protection range, tolerable interference threshold of the primary system and available time for secondary system to access, and so forth. The OAM node may forward the information about the available ASA spectrum to a MME. The MME may find out an affected BS based on the spectrum information and BS location information and notify the affected BS to evacuate the ASA frequency band. Then the affected BS may send change information about the affected BS to the CoMP central controller. As such, the CoMP central controller may receive the change information from the affected BS. Related details will be found in embodiments in connection with FIG. 7.

At step S202, the change information is sent to a serving node coordinating transmission within constituent cells of a CoMP set, to indicate a change of the CoMP set.

According to embodiments of the present invention, optionally, the method 200 may further comprise a step of receiving an acknowledge message from the serving node, wherein the acknowledge message indicates that the change information has been successfully received by the serving node.

According to embodiments of the present invention, serving node may determine CoMP information indicating whether the CoMP set will be continued based on the change information, and send the CoMP information to the CoMP central controller. As such, the method 200 may optionally comprise a step of receiving CoMP information from the serving node, wherein the CoMP information indicates whether the CoMP set will be continued. Specifically, in the case that there are three cells in the CoMP set and one of the cells is an affected cell, when the primary system requests for the ASA frequency band, the affected cell will not use the ASA frequency band any more. Upon receiving the change information regarding the affected cell, the serving node (e.g., the serving BS) has the knowledge that the affected cell will no longer serve the UE on the ASA frequency band. Thus, the serving BS will remove the affected cell from the CoMP set and notify the CoMP central controller.

According to embodiments of the present invention, the change information about the affected cell may comprise information about the affected BS, e.g., identification (name, ID, IP address, etc.) of the affected cell and/or affected BS. The change information may indicate that the affected cell is allowed to be added to or is to be removed from the CoMP set. For example, in the case that the primary system requests for the ASA frequency band f1, the affected BS should evacuate f1 and the affected cell will be removed from the CoMP set. In the case that the primary system does not use the ASA frequency band f1 any more, the affected cell may reuse f1 and the affected cell may be added to the CoMP set. In this regard, the change information may comprise an indicator which indicates whether the affected cell is allowed to be added to or is to be removed from the CoMP set.

Figure 3:
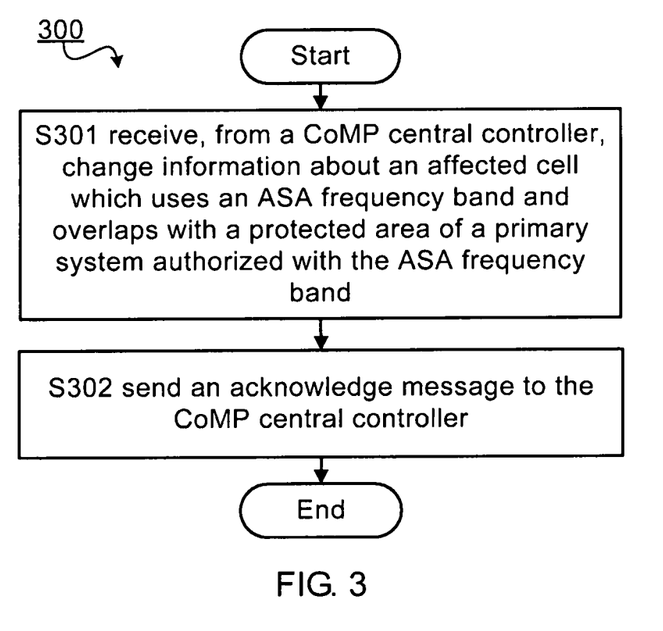
FIG. 3 illustrates a flow chart of a method 300 for managing a CoMP set in a communication system according to embodiments of the invention.

Reference is now made to FIG. 3, which illustrates a flow chart of a method 300 for managing a CoMP set in a communication system according to embodiments of the invention. In accordance with embodiments of the present invention, the method 300 may be carried out by a serving node, which coordinates transmission within constituent cells of the CoMP set. The serving node may be implemented as a BS managing the cell in the CoMP set, or any other suitable node in the communication system. According to embodiments of the present invention, the serving node may be a macro eNB. It is noted that this is only for the purpose of illustrating the principles of the present invention, rather than limiting the scope thereof.

In accordance with embodiments of the present invention, there may be multiple cells constituting the CoMP set. The affected cell is one of the constituent cells of the CoMP set. The serving node may be a serving BS which manages another one of the constituent cells.

At step S301, change information is received from a CoMP central controller, wherein the change information is about an affected cell which uses an ASA frequency band and overlaps with a protected area of a primary system authorized with the ASA frequency band.

At step S302, an acknowledge message is sent to the CoMP central controller.

The acknowledge message may indicate that the change information has been successfully received by a serving node which coordinates transmission within constituent cells of a CoMP set.

According to embodiments of the present invention, the method 300 may further comprise: determining CoMP information based on the change information, wherein the CoMP information indicates whether the CoMP set will be continued; and sending the CoMP information to the CoMP central controller.

According to embodiments of the present invention, the change information indicates that the affected cell is allowed to be added to or is to be removed from the CoMP set.

Figure 4:
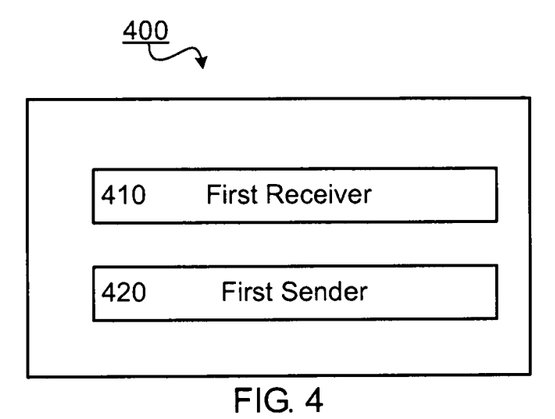
FIG. 4 illustrates a block diagram of an apparatus 400 for managing a CoMP set in a communication system according to embodiments of the invention.

Reference is now made to FIG. 4, which illustrates a block diagram of an apparatus 400 for managing a CoMP set in a communication system according to embodiments of the invention. As shown, the apparatus 400 comprises: a first receiver 410 configured to receive change information about an affected cell which uses an ASA frequency band and overlaps with a protected area of a primary system authorized with the ASA frequency Band; and a first sender 420 configured to send the change information to a serving node coordinating transmission within constituent cells of a CoMP set, to indicate a change of the CoMP set, wherein the affected cell is one of the constituent cells of the CoMP set. In accordance with embodiments of the present invention, the apparatus 400 may be implemented in a CoMP central controller or any other suitable device. The CoMP central controller may be implemented as a separated node in the communication system (e.g., communication system 100), or may be implemented in combination with a node, such as the MME (e.g., MME 105 as shown in FIG. 1), the serving node (e.g., eNB1 107 as shown in FIG. 1), or any other suitable node.

In accordance with embodiments of the present invention, the change information may be received from a Mobile Management Entity (MME).

In accordance with embodiments of the present invention, the change information may be received from the affected cell.

In accordance with embodiments of the present invention, the first receiver 410 may be further configured to receive an acknowledge message from the serving node, wherein the acknowledge message indicates that the change information has been successfully received by the serving node.

In accordance with embodiments of the present invention, the first receiver 410 may be further configured to receive CoMP information from the serving node, wherein the CoMP information indicates whether the CoMP set will be continued.

In accordance with embodiments of the present invention, the change information may indicate that the affected cell is allowed to be added to or is to be removed from the CoMP set.

Figure 5:
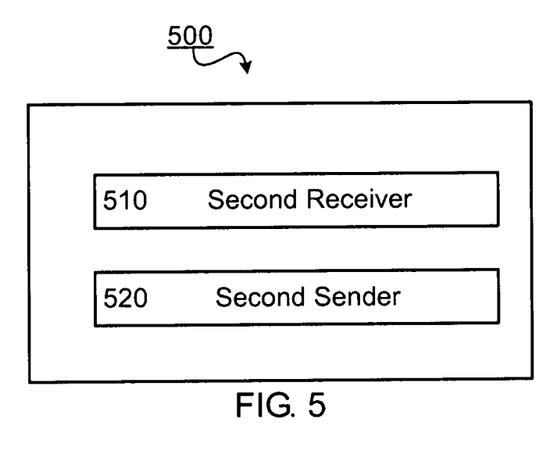
FIG. 5 illustrates a block diagram of an apparatus 500 for managing a CoMP set in a communication system according to embodiments of the invention.

Reference is now made to FIG. 5, which illustrates a block diagram of an apparatus 500 for managing a CoMP set in a communication system according to embodiments of the invention. As shown, the apparatus 500 comprises: a second receiver 510 configured to receive, from a CoMP central controller, change information about an affected cell which uses an ASA frequency band and overlaps with a protected area of a primary system authorized with the ASA frequency Band; and a second sender 520 configure to send an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

In accordance with embodiments of the present invention, the apparatus 500 may further comprise a determiner (not shown) configured to determine CoMP information based on the change information, wherein the CoMP information indicates whether the CoMP set will be continued, wherein the second sender is further configured to send the CoMP information to the CoMP central controller.

In accordance with embodiments of the present invention, the change information indicates that the affected cell is allowed to be added to or is to be removed from the CoMP set.

It is noted that the apparatus 400 may be configured to implement functionalities as described with reference to FIG. 2, and the apparatus 500 may be configured to implement functionalities as described with reference to FIG. 3. Therefore, the features discussed with respect to method 200 may apply to the corresponding components of the apparatus 400, and the features discussed with respect to the method 300 may apply to the corresponding components of the apparatus 500. It is further noted that the components of the apparatus 400 or 500 may be embodied in hardware, software, firmware, and/or any combination thereof. For example, the components of the apparatus 400 or 500 may be respectively implemented by a circuit, a processor or any other appropriate selection device. Those skilled in the art will appreciate that the aforesaid examples are only for illustration not limitation.

In some embodiment of the present disclosure, the apparatus 400 or 500 comprises at least one processor. The at least one processor suitable for use with embodiments of the present disclosure may include, by way of example, both general and special purpose processors already known or developed in the future. The apparatus 400 or 500 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 400 or 500 to at least perform according to methods as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2 and 3 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 6:
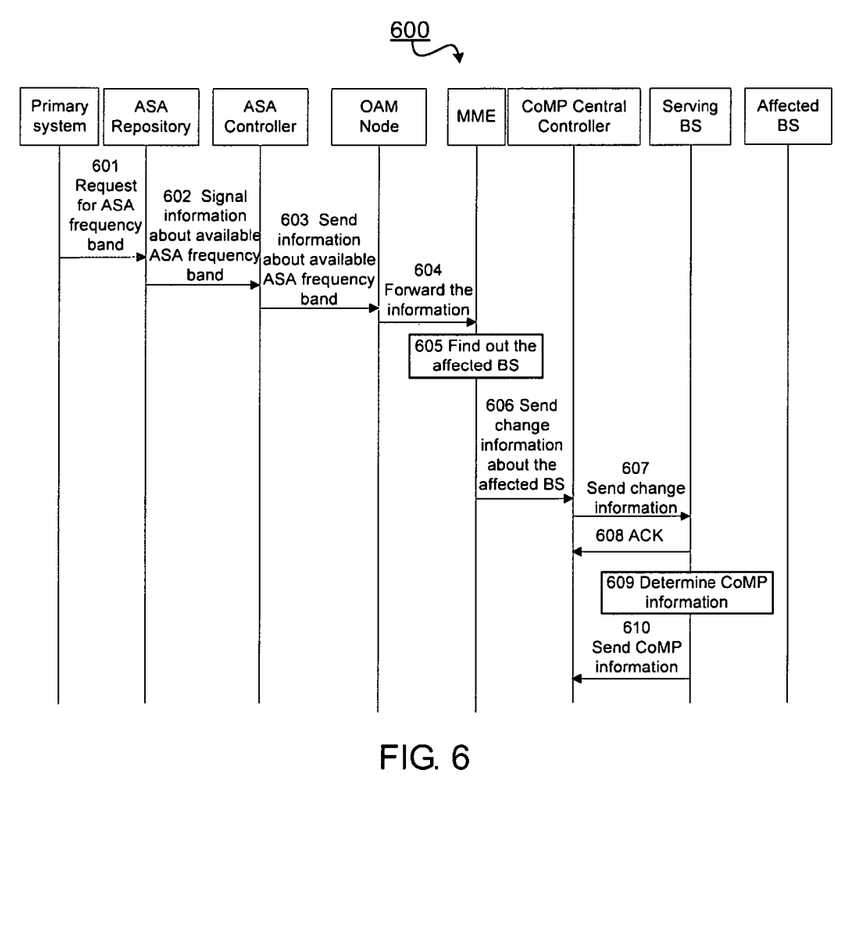
FIG. 6 illustrates a schematic diagram 600 for managing a CoMP set in a communication system according to embodiments of the invention.

Reference is now made to FIG. 6, which illustrates a schematic diagram 600 for managing a CoMP set in a communication system according to embodiments of the invention. The communication system may employ the architecture of the communication system 100 shown in FIG. 1. In the embodiments, the CoMP central controller may be a separated node in the communication system, or may be integrated with a MME.

As shown, according to embodiments of the present invention, first, a primary system reutilizes an ASA frequency band and request for 601 the ASA frequency band, e.g., by sending a request to an ASA repository to evacuate secondary systems on the ASA frequency band in the protected area. Upon request, the ASA repository may signal 602 information about the available ASA frequency band to the ASA controller. The information about the available ASA frequency band may include the requested or released ASA frequency band, primary system's protection range, tolerable interference threshold of the primary system and available time for secondary system to access, and so forth. The ASA controller sends 603 the information about the available ASA frequency band to the OAM node. The OAM node then forward 604 the information to a MME. Meanwhile, the OAM node may request the MME to evacuate the cell or BS on the ASA frequency band which interferes with the primary system. Upon receiving the command from the OAM node, the MME finds out 605 the affected BS based on the received information and BS location information. Accordingly, change information about the affected BS may be obtained. Then, the MME sends 606 the change information to the CoMP central controller. Upon receiving the change information, the CoMP central controller sends 607 the change information to a serving node. In the embodiments, the serving node is implemented as a BS coordinating transmission within cells of the CoMP set, that is, a serving BS. The serving BS sends 608 an acknowledge message (ACK) to the CoMP central controller to indicate that the change information has been successfully received.

According to some embodiments of the present invention, when the MME finds out the affected BS, it may request the affected BS to evacuate the ASA frequency band.

Optionally, the serving BS may determine 609 CoMP information indicating whether the CoMP set will be continued based on the change information, and send 610 the CoMP information to the CoMP central controller. Specifically, if there are three cells in the CoMP set and one of the cells is an affected cell. When the primary system requests for the ASA frequency band, the affected cell will not use the ASA frequency band any more. Upon receiving the change information regarding the affected cell, the serving node (e.g., the serving BS) has the knowledge that the affected cell will no longer serve the UE on the ASA frequency band, and may remove the affected cell from the CoMP set and notify the CoMP central controller.

It is to be noted that, both steps 609 and 610 are optional. The schematic diagram 600 may be implemented without steps 609 and 610. Those skilled in the art will understand that they are shown for example rather than limitation.

Figure 7:
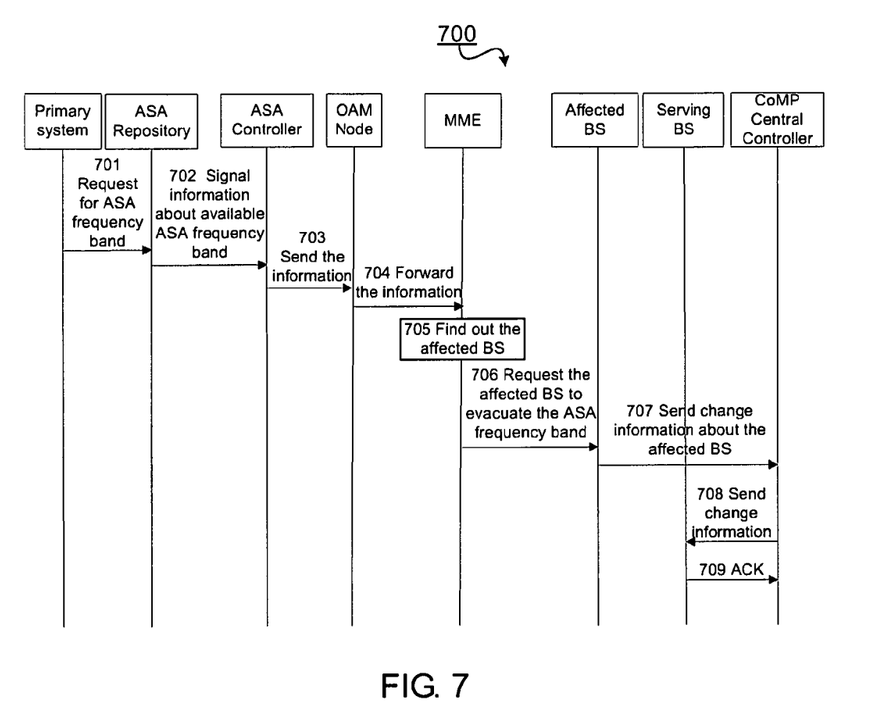
FIG. 7 illustrates a schematic diagram 700 for managing a CoMP set in a communication system according to embodiments of the invention.

Reference is now made to FIG. 7, which illustrates a schematic diagram 700 for managing a CoMP set in a communication system according to embodiments of the invention. The communication system may employ the architecture of the communication system 100 shown in FIG. 1. In the embodiments, the CoMP central controller may be a separated node in the communication system, or may be integrated with the serving node.

As shown, according to embodiments of the present invention, first, a primary system reutilizes an ASA frequency band and request for 701 the ASA frequency band, e.g., by sending a request to an ASA repository to evacuate secondary systems on the ASA frequency band in the protected area. Upon request, the ASA repository may signal 702 information about the available ASA frequency band to the ASA controller. The information about the available ASA frequency band may include the requested or released ASA frequency band, primary system's protection range, tolerable interference threshold of the primary system and available time for secondary system to access, and so forth. The ASA controller sends 703 the information about the available ASA frequency band to the OAM node. The OAM node then forwards 704 the spectrum information to a MME. The MME may find out 705 an affected BS based on the spectrum information and BS location information. Accordingly, change information about the affected BS may be obtained. The MME may request 706 the affected BS to evacuate the ASA frequency band. Upon receiving the spectrum release command from the MME, the affected BS may evacuate the ASA frequency band and send 707 change information about the affected BS to the CoMP central controller. Upon receiving the change information, the CoMP central controller may send 708 it to a serving node (e.g., a serving BS). The serving BS may send 709 to the CoMP central controller an acknowledge message (ACK), which indicates that the change information has been successfully received.

According to embodiments of the present invention, optionally, the CoMP central controller may determine whether the CoMP set will be continued (i.e. the affected cell will not be a cooperating cell on the carrier f1, and other cells in the CoMP set may continue to be cooperating cells for the UE's CoMP).

With respect to embodiments illustrated above, it is advantageous that, different from the existing solutions, the signaling reporting overhead and UE's measurement are reduced. It is also advantageous that, the continued execution of CoMP can be ensured when the ASA spectrum utilization changes.

According to embodiments of the present invention, if the primary system is to releases an ASA frequency band, it may notify the ASA repository, e.g., by requesting for releasing an ASA frequency band. The ASA repository may inform the information about the available ASA frequency band to ASA controller. The ASA controller may notify the OAM node, e.g., by sending the information about the available ASA frequency band to the OAM node. The OAM node may forward the information to a MME. Upon receiving the command from the OAM node, the MME may finds out the affected BS based on the received information and BS location information. Accordingly, change information about the affected BS may be obtained. Then the MME may send the change information to the serving BS, for example, indicating that affected cell is allowed to be joined into the CoMP set again. The serving BS may send an acknowledge message (ACK) to the CoMP central controller to indicate that the change information has been successfully received.

In accordance with embodiments of the present invention, the apparatus for managing a CoMP set in a communication system employing an ASA scheme may comprise: at least one processor; and at least one memory including compute program instructions, wherein the at least one memory and computer program instructions are configured to, with the at least one processor, cause the apparatus at least to: receive change information about an affected cell which uses an ASA frequency band and overlaps with a protected area of a primary system authorized with the ASA frequency band; and send the change information to a serving node coordinating transmission within constituent cells of a CoMP set, to indicate a change of the CoMP set, wherein the affected cell is one of the constituent cells of the CoMP set.

In accordance with embodiments of the present invention, the apparatus for managing a CoMP set in a communication system employing an ASA scheme may comprise: at least one processor; and at least one memory including compute program instructions, wherein the at least one memory and computer program instructions are configured to, with the at least one processor, cause the apparatus at least to: receive, from a CoMP central controller, change information about an affected cell which uses an ASA frequency band and overlaps with a protected area of a primary system authorized with the ASA frequency band; and send an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

In accordance with some embodiments of the present invention, a computer program product is proposed, which comprises at least one computer readable storage medium having a computer readable program code portion stored thereon, the computer readable program code portion comprising: program code instructions for receiving change information about an affected cell which uses an ASA frequency band and overlaps with a protected area of a primary system authorized with the ASA frequency band; and program code instructions for sending the change information to a serving node coordinating transmission within constituent cells of a CoMP set, to indicate a change of the CoMP set, wherein the affected cell is one of the constituent cells of the CoMP set.

In accordance with further embodiments of the present invention, a computer program product is proposed, which comprises at least one computer readable storage medium having a computer readable program code portion stored thereon, the computer readable program code portion comprising: program code instructions for receiving, from a CoMP central controller, change information about an affected cell which uses an ASA frequency band and overlaps with a protected area of a primary system authorized with the ASA frequency band; and program code instructions for sending an acknowledge message to the CoMP central controller, wherein the acknowledge message indicates that the change information has been successfully received by a serving node which coordinates transmission within constituent cells of a CoMP set, wherein the affected cell is one of the constituent cells of the CoMP set.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method, comprising:
   receiving at a coordinated multipoint (CoMP) central controller change information about an affected cell which uses an authorized shared access frequency band and overlaps with a protected area of a primary system authorized with the authorized shared access frequency band; and
   sending the change information from the CoMP central controller to a serving node coordinating transmission within constituent cells of a CoMP set, to indicate a change of the CoMP set,
   wherein the affected cell is one of the constituent cells of the CoMP set and the CoMP central controller is not a part of the CoMP set.

2. The method as recited in claim 1, wherein the change information is received from a mobile management entity.

3. The method as recited in claim 1, wherein the change information is received from the affected cell.

4. The method as recited in claim 1, further comprising:
   receiving at the CoMP central controller an acknowledge message from the serving node, wherein the acknowledge message indicates that the change information has been successfully received by the serving node.

5. The method as recited in claim 1, further comprising:
   receiving at the CoMP central controller coordinated multipoint information from the serving node, wherein the coordinated multipoint information indicates whether the coordinated multipoint set will be continued.

6. The method as recited in claim 1, wherein the change information indicates that the affected cell is allowed to be added to or removed from the coordinated multipoint set.

7. The method as recited in claim 1, wherein the serving node is a Macro evolved Node B that manages the coordinated multipoint set.

8. A coordinated multipoint (CoMP) central controller, comprising:
- at least one processor; and
- at least one memory including computer program instructions,
- wherein the at least one memory and computer program instructions are configured to, with the at least one processor, cause the CoMP central controller at least to:
- receive change information about an affected cell which uses an authorized shared access frequency band and overlaps with a protected area of a primary system authorized with the authorized shared access frequency band; and
- send the change information to a serving node coordinating transmission within constituent cells of a CoMP set, to indicate a change of the CoMP set,
- wherein the affected cell is one of the constituent cells of the CoMP set and the CoMP central controller is not a part of the CoMP set.

9. The CoMP central controller as recited in claim 8, wherein the change information is received from a mobile management entity.

10. The CoMP central controller as recited in claim 8, wherein the change information is received from the affected cell.

11. The CoMP central controller as recited in claim 8, wherein the at least one memory and computer program instructions with the at least one processor, cause the CoMP central controller to receive change information about an affected cell, are further configured to:
- receive an acknowledge message from the serving node, wherein the acknowledge message indicates that the change information has been successfully received by the serving node.

12. The CoMP central controller as recited in claim 8, wherein the at least one memory and computer program instructions with the at least one processor, cause the CoMP central controller to receive change information about an affected cell, are further configured to:
- receive coordinated multipoint information from the serving node, wherein the coordinated multipoint information indicates whether the CoMP set will be continued.

13. The CoMP central controller as recited in claim 8, wherein the change information indicates that the affected cell is to be added to or removed from the CoMP set.

14. The CoMP central controller as recited in claim 8, wherein the serving node is a Macro evolved Node B that manages the CoMP set.

15. A serving node coordinating transmission within constituent cells of a cooperative multipoint (CoMP) set, comprising:
- at least one processor; and
- at least one memory including computer program instructions,
- wherein the at least one memory and computer program instructions are configured to, with the at least one processor, cause the serving node at least to:
- receive, from a CoMP central controller that is not a part of the CoMP set, change information about an affected cell which uses an authorized shared access frequency band and overlaps with a protected area of a primary system authorized with the authorized shared access frequency band; and
- send an acknowledge message to the CoMP central controller, wherein the acknowledge message indicates that the change information has been successfully received,
- wherein the affected cell is one of the constituent cells of the CoMP set.

16. The serving node as recited in claim 15, wherein the at least one memory and computer program instructions are further configured to, with the at least one processor, cause the serving node at least to:
- determine coordinated multipoint information based on the change information, wherein the coordinated multipoint information indicates whether the CoMP set will be continued.

17. The serving node as recited in claim 16, wherein the at least one memory and computer program instructions with the at least one processor, cause the serving node to send an acknowledge message, are further configured to:
- send the coordinated multipoint information to the CoMP central controller.

18. The serving node as recited in claim 15, wherein the change information indicates that the affected cell is to be added to or removed from the CoMP set.

19. The serving node as recited in claim 15, wherein the serving node is a Macro evolved Node B that manages the CoMP set.

20. The serving node as recited in claim 15, wherein the CoMP central controller is the logical entity that manages the authorized shared access spectrum mobility.

* * * * *